No. 769,667. PATENTED SEPT. 6, 1904.
E. C. REED.
DENTAL SUCTION PLATE.
APPLICATION FILED OCT. 23, 1903.
NO MODEL.

Witnesses:
W. J. Wirick
W. S. Hissem

Inventor:
Edgar C. Reed

No. 769,667.

Patented September 6, 1904.

UNITED STATES PATENT OFFICE.

EDGAR C. REED, OF LOUDONVILLE, OHIO.

DENTAL SUCTION-PLATE.

SPECIFICATION forming part of Letters Patent No. 769,667, dated September 6, 1904.

Application filed October 23, 1903. Serial No. 178,185. (No model.)

*To all whom it may concern:*

Be it known that I, EDGAR C. REED, a citizen of the United States, residing at Loudonville, county of Ashland, State of Ohio, have invented certain new and useful Improvements in Dental Suction-Plates, of which the following is a full, clear, and exact description.

My invention relates to an improved method of making the air-chamber in dental plates. With all the improvements heretofore made for the purpose of producing or making an air-chamber the boundary of which is composed of flexible rubber great difficulty has been experienced to govern and control the location during vulcanization of the flexible rubber and in cutting a hole in said flexible rubber after vulcanization if said rubber has been inserted in the denture intact. If a hole is made in said rubber before being vulcanized, it is very difficult or impossible to maintain said hole in a neat and perfect shape during the process of vulcanizing and to keep the metal plate which forms the air-chamber in its proper location, it not being fastened to the model during vulcanization.

The object of my invention is to thoroughly overcome these great objections, and I accomplish this by the means illustrated in the accompanying drawings, in which similar numbers of reference refer to similar parts throughout the views.

Figure 1:
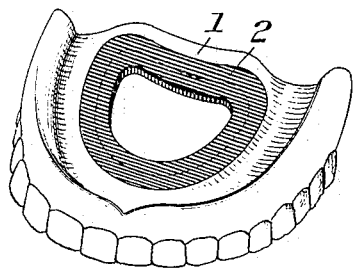
Figure 2:
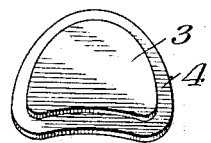
Figure 3:
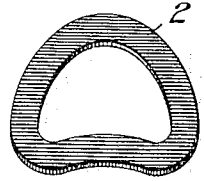
Figure 4:
Figure 5:
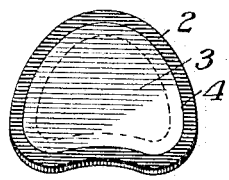

Figure 1 represents a perspective view of the upper plate with my improved air-chamber. Fig. 2 represents a small pliable metallic plate of such nature that it will not oxidize during vulcanization. Its shape must conform exactly to the shape of the opening or hole in the flexible-rubber form 2. On one side of said plate a small thin flange 4 protrudes entirely around its edge and parallel to said side, as shown in Fig. 4, the distance from the face of the plate to the flange regulating the thickness of the flexible rubber forming the boundary of the suction-cavity in the finished denture. Fig. 3 represents a flexible-rubber form, having a hole through the same of any general shape desired, since the hole will be the orifice leading to and will become an integral part of the suction-cavity or vacuum-chamber of the denture. Fig. 4 is the piece shown in Fig. 2 inverted. Fig. 5 shows the metallic plate 3 inverted and placed down into the hole in the rubber form 3 until the lower surfaces are even and the flange on top presses down firmly on said rubber form.

The detailed method of making said air-chamber is to take the rubber form, with the metallic plate inserted, Fig. 3, and place it at the spot desired on the plastic cast or model, pressing it down firmly with the thumb until it conforms to the curvature of the model, at which place it is securely fastened by means of a small tack driven through the metal into the cast or by means of sandarac varnish or shellac applied to the lower surfaces. The edge and the outer margin are exposed, Fig. 5, which surfaces will unite and become an integral part of the rubber of the plate, which rubber should now be applied in the usual way and vulcanized, after which the pliable metallic plate 2 can easily be removed by inserting a sharp instrument under its edge and gently lifting it out and cast aside as having served its purpose, thus producing a perfect air-chamber of the exact size and shape of the metal plate 2.

I am aware that prior to my invention dental plates or dentures have been made the sides of whose air-chamber were composed of flexible rubber. I therefore do not claim such a combination broadly; but What I do claim as my invention, and desire to secure by Letters Patent, is—

The herein-specified method of producing suction-cavities or air-chambers in dental suction-dentures, the same consisting of shaping and securely fastening a pliable metallic suction-plate of substantially cardioid form and having a continuous flange protruding from its upper outer edge and having a soft flexible, vulcanizable-rubber band surrounding the outer edge of said plate, beneath the flange, and a portion of said rubber being exposed or protruding continuously around said suction-plate, upon a plastic model, then conforming the material comprising the denture to the model over the suction-plate and the exposed portion of the rubber form, then flasking the model and attached plate and rubber form, and then vulcanizing, whereby the rubber form is secured to the rubber or other material comprising the denture by uniting with the exposed portions of the rubber form, then removing denture from the model and the suction-plate from the denture, and then finishing in the ordinary manner, substantially as set forth.

In testimony whereof I have signed my name to this specification in the presence of two subscribing witnesses.

EDGAR C. REED.

Witnesses:
C. B. STOCKMAN,
W. J. WEIRICK.